H. E. COOKE.
Lawn and Garden Sprinklers.
No. 141,632. Patented August 12, 1873.
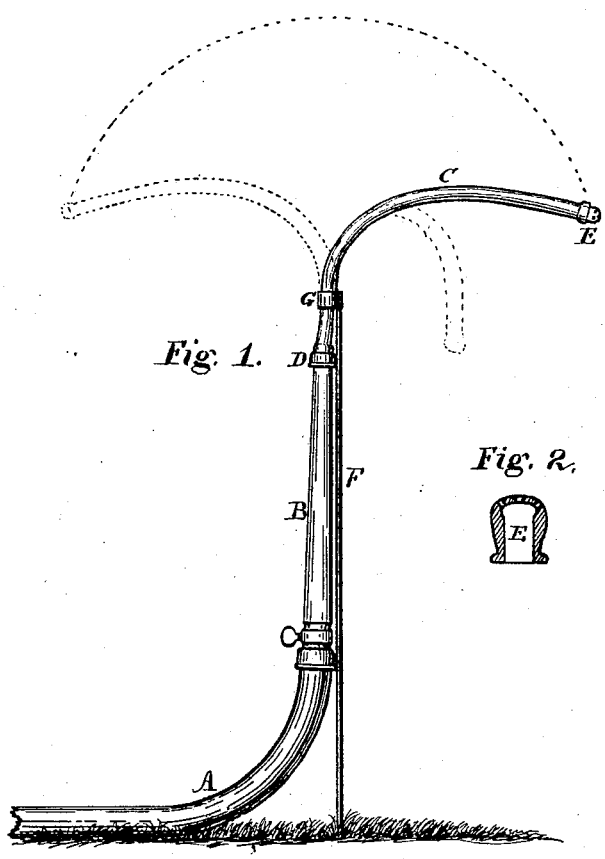
Witness.
Geo. H. Tibbitts
Jas Mhon
Inventor.
Henry E. Cooke

UNITED STATES PATENT OFFICE.

HENRY E. COOKE, OF CLEVELAND, OHIO.

IMPROVEMENT IN LAWN OR GARDEN SPRINKLERS.

Specification forming part of Letters Patent No. 141,632, dated August 12, 1873; application filed July 2, 1873.

*To all whom it may concern:*

Be it known that I, HENRY E. COOKE, of Cleveland, Ohio, have invented a Lawn or Garden Sprinkler, of which the following is a specification:

This invention has for its object a self-operating sprinkler or automatic distributer of water over the surface of the ground on a lawn or garden; and consists of a flexible or rubber hose having a perforated tip attached to the nozzle of a hose-pipe, or attached to the hose leading from a hydrant, the said hose-pipe or leading hose being supported by a staff or rod set perpendicularly in the ground. The flexible hose on the end of the hose-pipe is smaller than the leading hose, and is caused to straighten out by the force of the water passing through it. The said small hose by this means is caused to flop over from one side to another, as seen in dotted line in the accompanying drawing, whereby the water is thrown about in various directions and distributed over the ground.

To fully understand its construction and operation reference is made to the drawing, in which—

Figure 1 is an elevation of my above-mentioned sprinkler. Fig. 2 is a detached and full-sized view of the tip.

A is a portion of hose commonly used leading from a hydrant having a hose-pipe, B, attached. (This hose-pipe may be dispensed with if desired, but is more convenient for having a cock for turning the water on or off.) Attached to the nozzle of the hose-pipe B is a section of smaller hose C, of about twelve (12) inches length, by means of a coupling, D. In the outer end of the small hose C is placed a tip, E, seen in enlarged section, Fig. 2, which is pierced in the end with a series of small holes for distributing the water in a number of jets. The hose-pipe B and hose C is supported in an upright position by a staff or rod, F, set in the ground, having a ring, G, at the top through which the small hose C is passed and fitting sufficiently tight to retain the hose in place. The tendency of the small hose C is to hang with the tip end downward, but the water in passing through it forces it upward into a perpendicular position, when said force becoming somewhat spent the said hose falls over or downward again, and thus by this intermittent movement the hose C is caused to perform a constant series of gyrations, throwing and sprinkling the water about in all directions.

Having described my invention, I claim—

The combination and arrangement of the small hose C, tip E, staff F, and ring G, (either with or without the pipe B,) with the hose A, as and for the purpose set forth.

HENRY E. COOKE.

Witnesses:
GEO. HESTER,
GEO. W. TIBBITTS.